United States Patent
Woywod et al.

(10) Patent No.: US 6,205,392 B1
(45) Date of Patent: Mar. 20, 2001

(54) METHOD FOR REGISTERING A VEHICLE DECELERATION OR ACCELERATION

(75) Inventors: Jürgen Woywod, Mörfelden; Ronald Lehmer, Steinbach; Manfred Dornseiff, Friedrichshafen, all of (DE)

(73) Assignee: Continental Teves AG & Co., OHG (DE)

(*) Notice: Subject to any disclaimer, the term of this patent is extended or adjusted under 35 U.S.C. 154(b) by 0 days.

(21) Appl. No.: 09/284,165

(22) PCT Filed: Aug. 26, 1997

(86) PCT No.: PCT/EP97/04650

§ 371 Date: Jun. 14, 1999

§ 102(e) Date: Jun. 14, 1999

(87) PCT Pub. No.: WO98/16838

PCT Pub. Date: Apr. 23, 1998

(30) Foreign Application Priority Data

Oct. 12, 1996 (DE) .............................................. 196 42 122

(51) Int. Cl.⁷ .................................. B60T 8/50; B60T 8/72
(52) U.S. Cl. ............................ 701/70; 180/197; 303/171
(58) Field of Search .................................. 701/70, 74, 79, 701/83; 180/197, 233; 303/174, 182, 178, 171, 173; 188/181 R, 181 A; 361/238; 324/162

(56) References Cited

U.S. PATENT DOCUMENTS

| | | | |
|---|---|---|---|
| 4,193,642 | 3/1980 | Miller | 303/183 |
| 5,058,019 | * 10/1991 | Litkouhi | 364/426.02 |
| 5,208,754 | * 5/1993 | Nakaura et al. | 364/426.01 |
| 5,257,192 | * 10/1993 | Masaki | 364/426.02 |
| 5,469,358 | * 11/1995 | Ruhnau | 364/426.02 |
| 5,608,631 | * 3/1997 | Tsutsumi et al. | 364/426.018 |

FOREIGN PATENT DOCUMENTS

| | | |
|---|---|---|
| 22 55 241 | 5/1973 | (DE) . |
| 34 26 663 | 1/1985 | (DE) . |
| 40 02 035 | 8/1990 | (DE) . |
| 40 16 661 | 11/1990 | (DE) . |
| 40 24 147 | 2/1992 | (DE) . |
| 41 04 775 | 8/1992 | (DE) . |
| 44 30 458 | 2/1996 | (DE) . |
| 44 32 893 | 3/1996 | (DE) . |
| 43 14 830 | 11/1994 | (EP) . |

OTHER PUBLICATIONS

Search Report of the German Patent Office for Application 19642122.5.

* cited by examiner

Primary Examiner—Tan Nguyen
Assistant Examiner—Dalena Tran
(74) Attorney, Agent, or Firm—Rader, Fishman & Grauer PLLC

(57) ABSTRACT

Method of Determining a Vehicle Deceleration or Acceleration A method which permits determining a vehicle deceleration or acceleration from the signals of the wheel sensors. The method includes two different types of calculation which take into consideration that the vehicle is temporarily in a slip control operation during which the single wheel speeds per se are not representative of the vehicle speed. If some of the wheels are not subjected to slip control, these wheels may be taken into account for determining the vehicle deceleration or acceleration. If, however, all the wheels undergo a slip control operation, a maximum amount gradient is respectively determined from the speed variation of non-driven wheels which comes closest to the vehicle deceleration.

8 Claims, 2 Drawing Sheets

METHOD FOR REGISTERING A VEHICLE DECELERATION OR ACCELERATION

TECHNICAL FIELD

The present invention relates to a method of determining a vehicle deceleration or acceleration.

BACKGROUND OF THE INVENTION

To determine the deceleration or acceleration of a vehicle, it is known in the art to employ acceleration sensors which have an inertia element that is displaced from an inactive position when acceleration or deceleration occurs.

An object of the present invention is to determine a vehicle deceleration or acceleration at any time and in all driving situations without additional sensors by way of wheel sensor signals alone.

SUMMARY OF THE INVENTION

In order that a prevailing vehicle deceleration or acceleration can reliably be determined by way of wheel sensor signals, the wheel sensor signals to be taken into account must satisfy defined requirements. These requirements include that the wheel or the wheels whose circumferential speed is made the basis of determination of a vehicle deceleration or acceleration do not greatly differ from the vehicle speed. The wheels must not exhibit excessive acceleration or deceleration values and must have a sufficient adhesion with the road surface.

Filtering the deceleration or acceleration values obtained smoothens unplausible peak values.

One indication that a vehicle wheel behaves approximately like the entire vehicle in terms of its speed is that this wheel is not subjected to a brake pressure control operation, i.e., does not exhibit excessive slip. If, however, all wheels undergo slip control or any other brake pressure control operations, it is possible as an auxiliary means to select those wheels which are in a pressure increase phase again after a slip control operation. Such a pressure increase phase indicates that the wheel concerned no longer has a locking tendency and obviously has a sufficient adhesion.

During braking with brake slip control, when all wheels undergo slip control, a second type of calculation which, due to the occurring braking, always applies to deceleration only, can additionally be performed in parallel to the above-described type of calculation of a vehicle deceleration or acceleration. A single wheel is chosen which exceeds a defined deceleration threshold. Pairs of values which are made up of the point of time and instantaneous single wheel speed are produced, and a speed gradient is calculated in each case from two such pairs of values. The pairs of values may of course originate from different wheels.

The first value of vehicle deceleration or acceleration determined can develop from averaging the vehicle deceleration or acceleration determined by the first type of calculation, and the gradient.

In the further course of performing the second type of calculation, there can be carried out a time filtering operation with the vehicle deceleration or acceleration values previously calculated in this way so that the averaging with the value of the first type of calculation becomes unnecessary.

To produce gradients, preferably such points of time are determined where the current gradient has an extreme value. The result is quasi a smoothened speed curve so that the vehicle deceleration does not make unplausible jumps. Such jumps typically occur only with the single wheel speeds because these pass through different phases during slip control. This has little signifying value for the vehicle deceleration, however.

It is advisable for the same reason not to position the points of time for the pairing of values too close to one another because the single wheel speeds may possibly have major discrepancies in time. That is to say, a minimum distance between the selected moments will also smoothen the curve of the vehicle deceleration.

If none of the wheels satisfy the criteria for being chosen for the above-mentioned types of calculation, the last determined value of vehicle deceleration can be maintained for the time being until a new value can be found.

This way, it is ensured at any time that a calculated value for the vehicle deceleration or acceleration prevails which is very close to reality.

This offers a number of advantages. For example, knowing the present vehicle deceleration or acceleration permits an infinitely variable and permanent evaluation of the road surface friction coefficients during brake pressure control, traction slip control or also yaw torque control in order to improve the control quality. The respective control can be adjusted better to the present driving situation by selecting respectively appropriate algorithms. Brake pressure increase and decrease may be better adapted to the actual friction coefficient which is easier to determine. Special road surface conditions, such as different friction coefficients on the left and right vehicle sides, or abrupt changes in friction coefficients can be detected more quickly. The slip of the individual wheels can also be calculated better. The determined vehicle deceleration can also be taken into account as the basis of an alternative determination of a vehicle reference speed.

A more detailed explanation of the idea of the present invention will now be presented by way of the description of an embodiment for determining the vehicle deceleration during brake slip control.

DETAILED DESCRIPTION OF THE PREFERRED EMBODIMENTS

It must be noted that especially the numerical values indicated refer to examples which shall represent plausible orders of magnitude.

Figure 2:
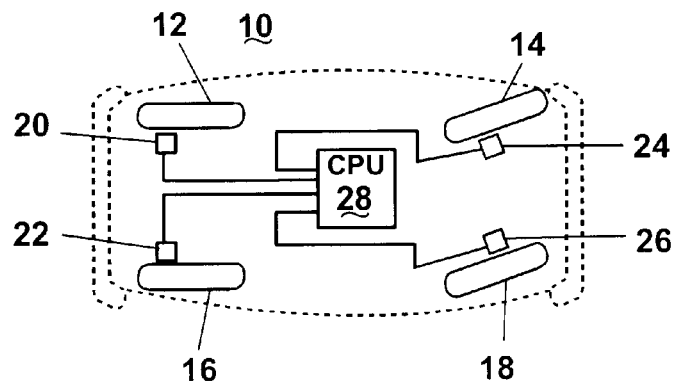
FIG. 2 illustrates a four-wheel vehicle with acceleration sensors.

Shown in FIG. 2 is a vehicle 10 with wheels 12, 14, 16, and 18, and wheel speed sensors 20, 22, 24, and 26 each of which is attached to a respective wheel. Signals generated by the wheel sensors are transmitted to a Central Processing Unit 28 where all the calculations necessary for implementing the present invention are performed.

If a vehicle wheel reaches excessive brake slip conditions during pedal-operated braking, an anti-lock system will intervene to decrease the brake slip. Not all of the wheels must be concerned simultaneously by such a brake slip control operation.

Figure 3:
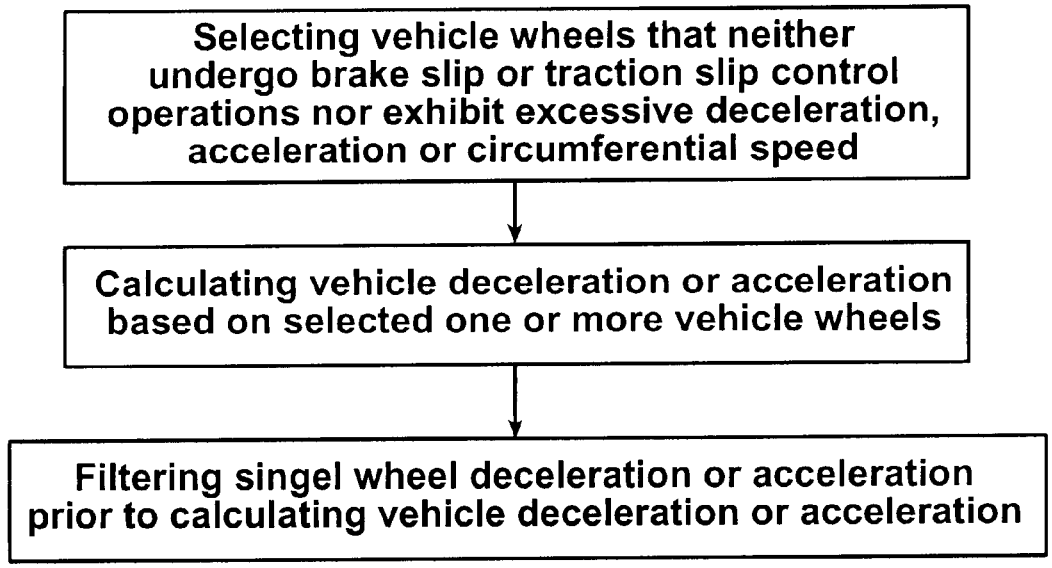
FIGS. 3 and 4 show sequence of operations according to various aspects of the invention.

FIG. 3 outlines how a first type of calculations is performed.

To implement a first type of calculation of a vehicle deceleration $a_{filt}$, those filtered single wheel decelerations $a_{Radfilt}$ calculated within the anti-lock system are added whose associated wheels satisfy the following conditions:
1. The wheel does not exhibit an excessive single wheel speed, i.e., the wheel is no overspinning wheel. An overspinning wheel is detected by a discrepancy from the vehicle reference speed.
2. The wheel does not undergo brake slip control.
3. The wheel does not undergo traction slip control.
4. The filtered single wheel deceleration satisfies the inequality $$1{,}5 \text{ g} > a_{Radfilt} > -2{,}5 \text{ g}$$

The sum of the filtered single wheel decelerations is divided by the number of the selected wheels and undergoes low-pass filtering, for example, according to the formula:

$$a_{\text{filt n}} = \frac{29 * a_{\text{filt n}-1} + \frac{\sum_{i=1}^{m} a_{\text{Rad filt } i}}{m}}{30}$$

In this formula, m is the number of the selected wheels. The time derivative of $a_{filt}$ is limited to at most ±6,6 g/s because a jerk of greater amount is unrealistic.

If, however, none of the wheels satisfy the above-mentioned conditions, other conditions are presented as an auxiliary means. Then, those wheels will be chosen which satisfy the following condition:

The wheel is in a pressure increase phase during a brake slip control operation.

A single wheel deceleration which does not satisfy the condition $$a_{fzg} - 1{,}1 \text{ g} < a_{Rad} < a_{fzg} + 1{,}1 \text{ g}$$

is set to the corresponding limit value when any one of these limits is exceeded.

In this case of an auxiliary selection of wheels, the unfiltered single wheel decelerations rather than the filtered single wheel decelerations are used.

$$a_{\text{filt n}} = \frac{29 * a_{\text{filt n}-1} + \frac{\sum_{i=1}^{m} a_{\text{Rad } i}}{m}}{30}$$

When brake slip control is terminated, the filter constant k is preferably reduced from 30 to 10. This reduced filter constant applies only to a limited number of calculation loops, for example 30, and takes into consideration the extremely great dynamics of vehicle deceleration which may occur when leaving $$a_{\text{filt n}} = \frac{9 * a_{\text{filt n}-1} + \frac{\sum_{i=1}^{m} a_{\text{Rad filt } i}}{m}}{10}$$

brake slip control:

It may now occur that the original conditions for selecting a wheel are satisfied again by at least one wheel. A current determination of the filtered vehicle deceleration $a_{filt}$ is not possible. The last determined value of $a_{filt}$ is maintained in these cases.

Figure 4:
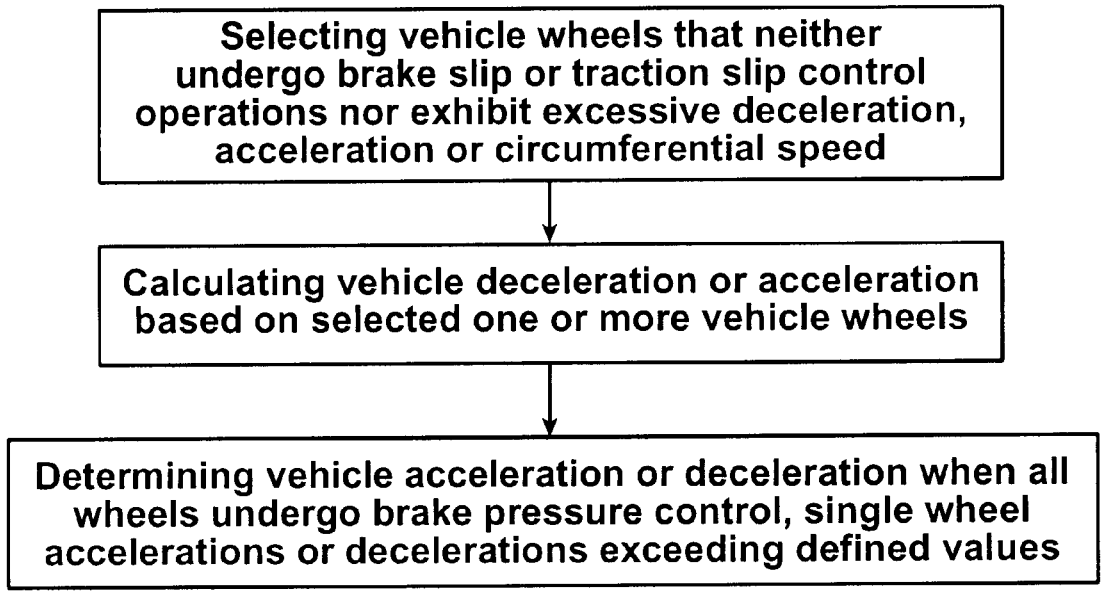

FIG. 4 outlines how a second type of calculations is performed.

When all the wheels of the vehicle are presently subjected to brake slip control, or at least the front wheels of the vehicle, a second type of calculation for determining the vehicle deceleration is performed in parallel to the first type of calculation. This second type of calculation is based on a production of gradients which calculates a deceleration within brake slip control operations from respectively two pairs of values in defined time intervals. Each pair of values comprises a single wheel circumferential speed of a non-driven wheel and the associated point of time. The pairs of values may also originate from different wheels. This vehicle deceleration $a_{grad}$ determined by the second type of calculation, however, forms the value of the estimated vehicle deceleration $a_{fzg}$ only if indeed all wheels, or at least the front wheels and one rear wheel, undergo a brake slip control operation. There is no auxiliary condition for this second type of calculation in the present embodiment. If the conditions are not satisfied, it is always the first type of calculation which is carried out.

One of the necessary conditions for implementing the second type of calculation implies that at least one wheel has a filtered deceleration value $a_{Radfilt}$ which is less than −0.5 g, with a vehicle acceleration being counted with a positive sign. That is to say, when a vehicle wheels reaches this deceleration, a first pair of values is produced, for example, at time $t_0$ in FIG. 1. Thus, the first pair of values is ($t_0$, $v_0$). Such a single wheel deceleration indicates that brake slip control is likely to occur. But only if six calculation loops later, i.e., roughly 42 msec later, the filtered single wheel deceleration of a wheel amounts to at least −1 g will the second type of calculation be continued. Otherwise, the first pair of values will be rejected, and the process will restart, because there obviously was a false measurement and brake slip control did not commence.

From the moment of the instantaneous acceleration of a front wheel exceeding 1 g, a gradient is produced in each calculation loop according to the following formula:

$$\text{grad}_{\text{akt}} = \frac{v_0 - v_i}{t_0 - t_i}$$

When a so calculated gradient becomes maximal and is not exceeded in at least ten calculation loops, and further the difference between the instantaneous and the maximum gradient is smaller than −0.45 g, the pair of values which is associated with the maximum gradient will be accepted as another pair of values so that a first value $a_{grad}$ may be calculated for the vehicle deceleration from the gradient:

$$a_{\text{grad 1}} = \frac{a_{\text{filt}} + \text{grad}_{\text{max}}}{2}$$

A time period be disposed between the first and the second pair of values which corresponds to the entry of a wheel into a slip situation. This means that the wheel should initially reach its maximum slip until a further pair of values is taken into account. Experience has shown that this occurs after roughly 200 msec, which corresponds to approximately 29 calculation loops in the present example. Such a time period should lie between all other pairs of values also. The wheels considered for the production of pairs of values should meet the following conditions:
1. The wheel is not driven.
2. The wheel does not exhibit an excessively high single wheel speed.

3. The wheel is not subjected to traction slip control. This is because traction slip control may also intervene with non-driven wheels if the wheels rotate at a too fast rate compared to the other vehicle wheels due to poor road surface conditions.

The respectively determined gradient is limited to 'reasonable' values:

$$0 > \text{grad}_{akt} > -1,28 \text{ g}$$

Values beyond a limit value are equated to the limit value.

Figure 1:
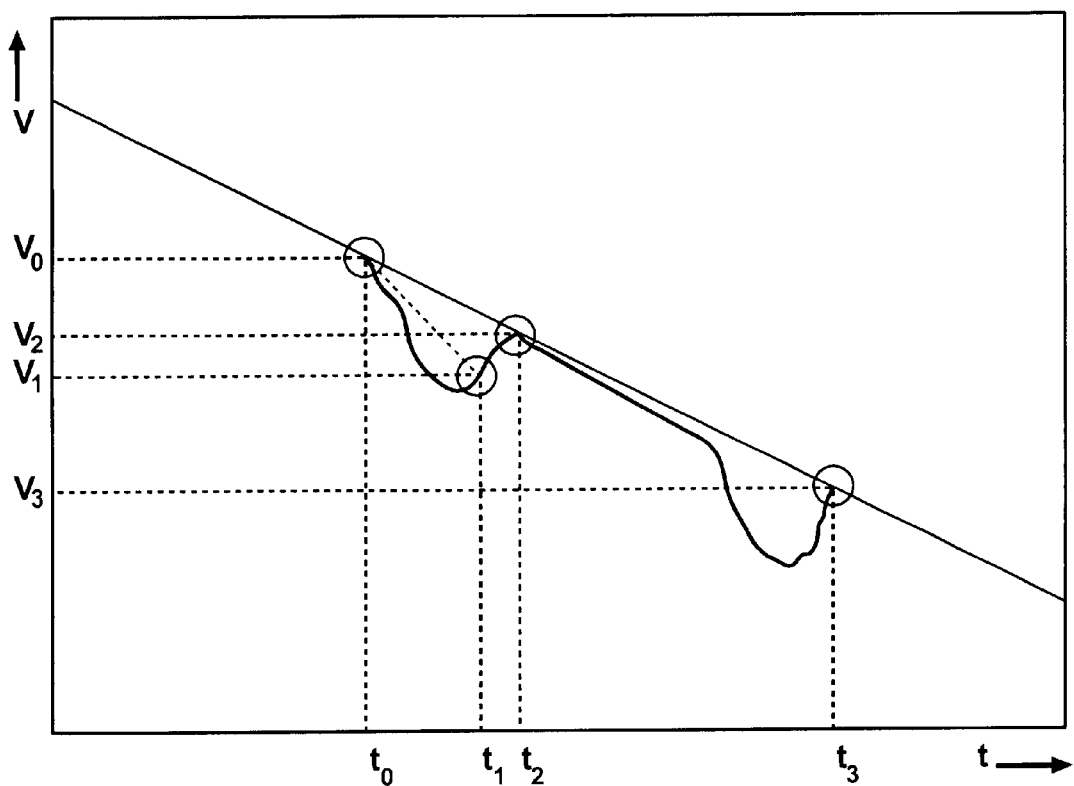
FIG. 1 shows a graph relating to the principle of producing gradients in implementing the second type of calculation of the vehicle deceleration.

This second type of calculation is illustrated in FIG 1. The single wheel speed, designated by reference character v, is plotted against the time t. As long as the wheel exhibits a deceleration which does not fall below –0.5 g, no pair of values is determined. A first pair of values of $t_0$ and $v_0$ is not produced until time $t_0$ when the deceleration of the wheel falls below –0.5 g. Because one wheel will fall below the threshold of –1 g in the further course within six calculation loops corresponding to roughly 42 msec, the pair of values chosen as first will be maintained. At a point $t_1$ when a wheel accelerates to exceed 1 g, initially, a second pair of values will be determined, and a gradient will be calculated according to the formula:

$$\text{grad}_{akt} = \frac{v_0 - v_1}{t_0 - t_1}$$

Because the gradient calculated herein, shown by the dotted line between the two pairs of values ($t_0/v_0$) and ($t_1$, $v_1$), is not maximal though, a gradient will be produced from now on in each calculation loop (not shown) until it is maximal for ten calculation loops. This is the case at the time $t_2$. Thus, $t_2$ and $v_2$ represent the second pair of values.

Thus, there applies $$\text{grad}_{max} = \frac{v_0 - v_2}{t_0 - t_2}$$

Now, the vehicle deceleration $a_{grad}$ is calculated for the first time by way of the maximum gradient determined this way, i.e., according to the formula $$a_{grad\ 1} = \frac{a_{filt} + \text{grad}_{max}}{2}$$

This is an averaging operation of the vehicle deceleration determined pursuant the first calculation method and the maximum gradient. In the further course, however, no longer the vehicle deceleration determined pursuant the first type of calculation but that one determined pursuant the second type of calculation is taken into account for the further calculation. A filter constant of k=3 is introduced:

$$a_{grad\ n} = \frac{2 * a_{grad\ n-1} + \text{grad}_{max}}{3}$$

Another maximum of the gradient is found at time $t_3$ according to FIG. 1. The vehicle deceleration $a_{grad}$ is calculated by way of the pair of values of $t_3$ and $v_3$ according to the above-mentioned formula with the gradient $$\text{grad}_{max} = \frac{v_2 - v_3}{t_2 - t_3}$$

It is obvious from FIG. 1 that in spite of a major discrepancy of the single wheel speed from the actual vehicle speed, the selection of the maximum gradient during a brake slip control operation nonetheless permits achieving an information which corresponds to the actual vehicle deceleration even from such a single wheel deceleration because the selected maximum gradients smoothen the speed curve. In a brake slip control operation, a wheel roughly adopts the vehicle speed when it runs with minimum slip. This means during braking, when it exhibits a speed maximum. This point is utilized by the present invention.

As has been explained hereinabove, it is possible to determine a highly current value for the vehicle deceleration in almost every driving situation. Should this be impossible, an old value may be taken which, however, is only a fractional part of a second old due to the short duration of the calculation loops. The vehicle deceleration or acceleration is equated to the deceleration value $a_{grad}$ determined pursuant the second type of calculation only if indeed all the wheels are in a brake slip control situation and the initial deceleration conditions for this second type of calculation prevail. Otherwise, the deceleration or acceleration value $a_{filt}$ determined pursuant the first type of calculation will always be used.

What is claimed is:

1. Method of determining a vehicle deceleration or acceleration from the wheel speeds of a vehicle equipped with an electronic braking pressure control system, comprising the steps of:
   (A) selecting all vehicle wheels that neither undergo brake slip or traction slip control operations nor exhibit an excessive deceleration, acceleration or circumferential speed,
   (B) calculating vehicle deceleration or acceleration based on said selected one or more vehicle wheels, and
   (C) filtering aid single wheel deceleration or acceleration prior to calculating the vehicle deceleration or acceleration, wherein the vehicle deceleration or acceleration is determined in a time filtering operation defined by the following relationship:

$$a_{filt\ n} = \frac{(k-1) * a_{filt\ n-1} + \frac{\sum_{i=1}^{m} a_{Rad\ filt\ i}}{m}}{k}$$

where:
   k is the filter constant,
   n is the consecutive number of the current calculation loop,
   m is the number of the selected wheels.

2. Method of determining a vehicle deceleration or acceleration from the wheel speeds of a vehicle equipped with an electronic braking pressure control system, comprising the steps of:
   (A) selecting all vehicle wheels that neither undergo brake slip or traction slip control operations nor exhibit an excessive deceleration, acceleration or circumferential speed, (B) calculating vehicle deceleration or acceleration based on said selected one or more vehicle wheels, and (D) determining the vehicle deceleration or acceleration when all of the vehicle wheels undergo brake pressure control and the amounts of single wheel decelerations or accelerations exceed defined values, and a vehicle wheel is selected at defined points of time for supplying a pair of values made up of the circumferential speed ($v_i$) and point of time ($t_i$), and a gradient is produced pursuant the formula:

$$\text{grad}_{\text{akt}} = \frac{v_i - v_j}{t_i - t_j}$$

3. Method as claimed in claim 2, further including the step of (E):

the first value of the vehicle deceleration or acceleration calculated pursuant to step (D), a mean value of the vehicle deceleration or acceleration is determined pursuant the first type of calculation and the gradient produced is adopted.

4. Method as claimed in claim 2, wherein at least the second and each further value of the vehicle deceleration or acceleration determined pursuant to step (D) originates from a time filtering operation of the values of the vehicle decelerations or accelerations previously determined pursuant to step (D).

5. Method as claimed in claim 2, wherein for the production of gradients those points of time are determined where the amount of the current gradient exhibits a maximum for a defined period.

6. Method as claimed in claim 5, wherein for the production of the maximum gradient only those points of time are determined where the difference between the current gradient and the maximum of the gradient is less than −0.4 g after expiry of the defined period.

7. Method as claimed in claim 2, wherein the defined points of time are separated from one another by at least a defined period.

8. Method as claimed in claim 2, further including the step of (E);

in the absence of wheels satisfying the selection criteria of steps (A) or (D), the last value of vehicle deceleration or acceleration determined pursuant the first type of calculation is maintained.

* * * * *